United States Patent
Dixon

(10) Patent No.: US 8,255,774 B2
(45) Date of Patent: Aug. 28, 2012

(54) DATA STORAGE SYSTEM WITH NON-VOLATILE MEMORY FOR ERROR CORRECTION

(75) Inventor: Robert William Dixon, Longmont, CO (US)

(73) Assignee: Seagate Technology, Cupertino, CA (US)

( * ) Notice: Subject to any disclaimer, the term of this patent is extended or adjusted under 35 U.S.C. 154(b) by 680 days.

(21) Appl. No.: 12/372,314

(22) Filed: Feb. 17, 2009

(65) Prior Publication Data

US 2010/0211851 A1 Aug. 19, 2010

(51) Int. Cl.
*G11C 29/00* (2006.01)

(52) U.S. Cl. .................................................. 714/773

(58) Field of Classification Search .................. 714/746, 714/763, 764, 773; 711/154; 365/200–201
See application file for complete search history.

(56) References Cited

U.S. PATENT DOCUMENTS

| | | | |
|---|---|---|---|
| 5,459,742 A * | 10/1995 | Cassidy et al. | 714/769 |
| 5,644,697 A | 7/1997 | Matsumoto et al. | |
| 5,701,406 A | 12/1997 | Matsumoto et al. | |
| 5,701,407 A | 12/1997 | Matsumoto et al. | |
| 5,737,745 A | 4/1998 | Matsumoto et al. | |
| 6,282,670 B1 | 8/2001 | Rezaul Islam et al. | |
| 6,317,371 B2 | 11/2001 | Katayama et al. | |
| 6,388,919 B2 | 5/2002 | Terasaki | |
| 6,498,749 B1 | 12/2002 | Cuppens et al. | |
| 6,704,838 B2 | 3/2004 | Anderson | |
| 7,191,286 B2 | 3/2007 | Forrer, Jr. et al. | |
| 7,219,271 B2 | 5/2007 | Kleveland et al. | |
| 7,360,037 B2 * | 4/2008 | Higaki et al. | 711/154 |
| 8,020,115 B2 | 9/2011 | Borri | |
| 8,078,918 B2 * | 12/2011 | Diggs et al. | 714/42 |
| 8,095,851 B2 * | 1/2012 | Diggs et al. | 714/763 |
| 2007/0268905 A1 | 11/2007 | Baker et al. | |
| 2008/0130156 A1 | 6/2008 | Chu et al. | |
| 2008/0133448 A1 | 6/2008 | Molaro et al. | |
| 2008/0177938 A1 | 7/2008 | Yu | |
| 2008/0215952 A1 * | 9/2008 | Bae | 714/756 |

FOREIGN PATENT DOCUMENTS

| | | |
|---|---|---|
| WO | 2006130391 | 12/2006 |
| WO | 2006130391 | 11/2008 |

OTHER PUBLICATIONS

Jin Hyuk Yoon et al: "Chameleon: A High Performance Flash/FRAM Hybrid Solid State Disk Architecture" IEEE Computer Architecture Letters, IEEE, US, vol. 7, No. 1, Jan. 1, 2008 (Jan. 1, 2008), pp. 17-20, XP011204041 ISSN: 1556-6056.

"Use of Non-Volatile Semiconductor Storage for Disk Array Parity" IBM Technical Disclosure Bulletin, International Business Machines Corp. (Thornwood), US, vol. 33, No. 6B, Nov. 1, 1990 (Nov. 1, 1990), p. 254, XP000108861 ISSN: 0018-8689.

PCT Search report for WO2010096421.

* cited by examiner

*Primary Examiner* — Shelly A Chase

(74) *Attorney, Agent, or Firm* — Braden Katterheinrich

(57) ABSTRACT

The present disclosure provides a data storage system with non-volatile memory for error correction. In one example, a data storage system is provided and includes a first data storage device comprising a first non-volatile data storage medium and a second data storage device that comprises a second non-volatile data storage medium. The system also includes a controller configured to store data to the first data storage device. The controller is configured to selectively generate error correction information for selected portions of the data based on at least one attribute associated with the data and store the error correction information in the second data storage device.

21 Claims, 8 Drawing Sheets

DATA STORAGE SYSTEM WITH NON-VOLATILE MEMORY FOR ERROR CORRECTION

BACKGROUND

The present disclosure relates generally to data storage systems, and more specifically, but not by limitation, to a data storage system having non-volatile memory for error correction.

An exemplary data storage system includes a device having a medium for data storage. Data in the data storage system can be susceptible to errors, such as, but not limited to, hardware errors, logical errors, etc. For instance, errors in data can be caused by media defects. Further, errors can occur when data is written to the medium, while the data is stored on the medium, and/or when data is read from the medium, for example.

The discussion above is merely provided for general background information and is not intended to be used as an aid in determining the scope of the claimed subject matter.

SUMMARY

The present disclosure provides a data storage system with non-volatile memory for error correction. In one exemplary embodiment, a data storage system is provided and includes a first data storage device comprising a first non-volatile data storage medium and a second data storage device comprising a second non-volatile data storage medium. The system also includes a controller configured to store data to the first data storage device. The controller is configured to selectively generate error correction information for selected portions of the data based on at least one attribute associated with the data and store the error correction information in the second data storage device.

In another exemplary embodiment, a controller is provided and includes an input for receiving data to be stored in the data storage device and a processing component configured to identify information associated with an attribute related to the data and selectively generate error correction information for selected portions of the data based on the attribute. The data is stored to a first data storage medium in the data storage device. The controller also includes an output for storing the error correction information to a second data storage medium in the data storage device that is different than the first data storage medium.

In another exemplary embodiment, a device is provided and includes a first data storage medium, a second data storage medium, and a controller. The controller is configured to access a portion of data stored in one or more storage locations associated with the first data storage device. The portion of data contains at least one error. The controller is configured to correct the at least one error and store the corrected portion of data in the second data medium. The controller is configured to perform a re-certification operation for the one or more storage locations while the corrected portion of data is stored in the second data storage device.

These and various other features and advantages will be apparent from a reading of the following Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
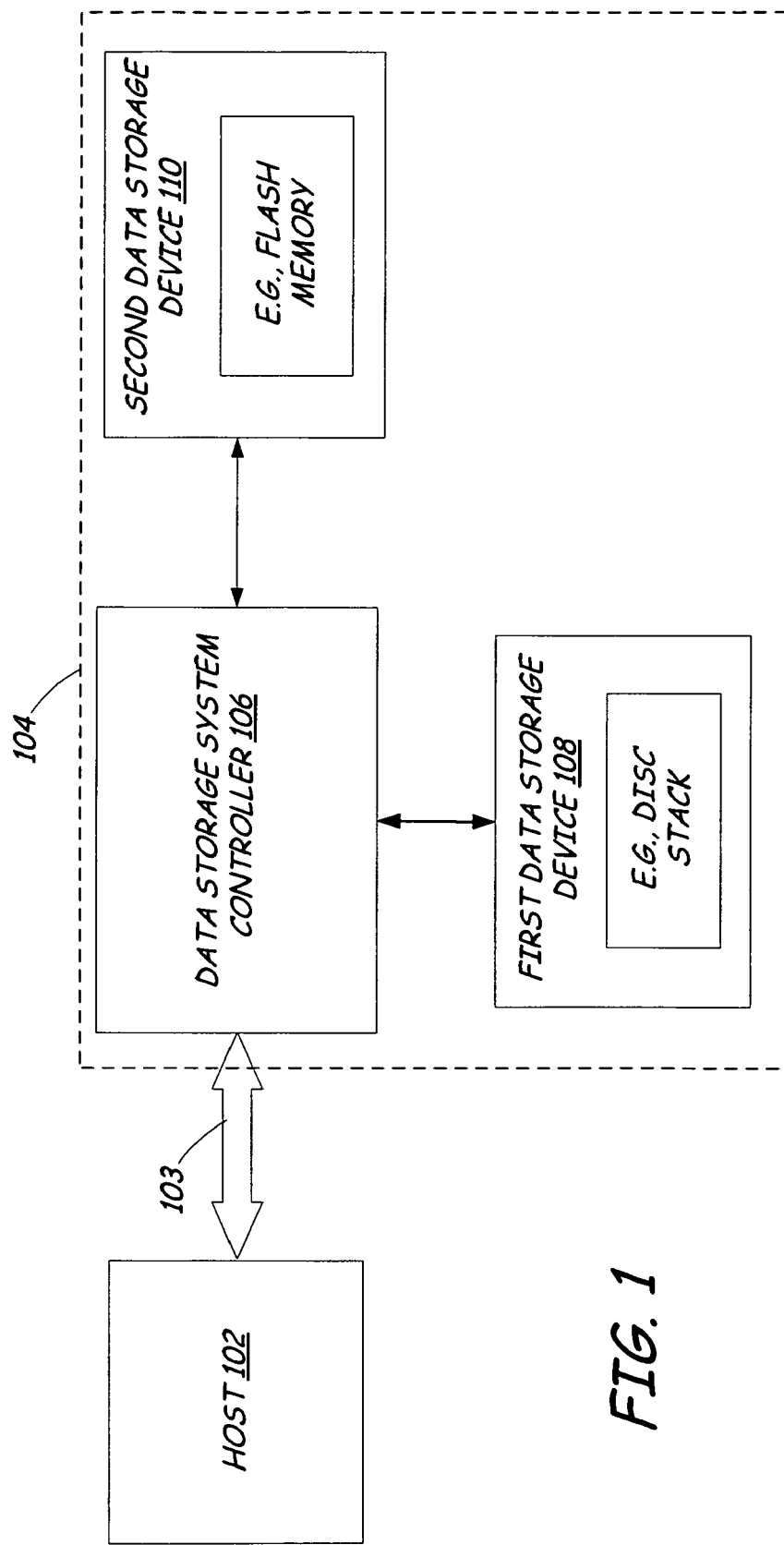
FIG. 1 is a schematic diagram of an exemplary data storage system.

FIG. 1 is a schematic diagram of an exemplary data storage system 104 that includes at least one data storage device. In the illustrated embodiment, data storage system 104 is communicatively coupled to a host 102. Host 102 can include any device, component, system, sub-system, application, and the like, that communicates (e.g., sends, receives, accesses, requests, processes data) with data storage system 104. In one example, host 102 comprises a computing device such as, but not limited to, a personal computer, laptop computer, server, portable electronic device, mobile device, digital music player, mobile phone, personal digital assistant (PDA), to name a few. It is noted that data storage system 104 can be included within or can be external to host 102. For example, in one embodiment data storage system 104 comprises a data storage drive, such as, but not limited to, a hard disc drive (HDD), a solid-state drive (SDD), a "hybrid" drive (e.g., a hybrid hard drive (HHD)), and the like, that is coupled to the host 102 using any suitable type of data connection.

Data storage system 104 includes a controller 106 that is configured to communicate with the host 102 through a data channel 103. As illustrated in FIG. 1, data storage system 104 includes a first data storage device 108 and a second data storage device 110. Controller 106 is configured to store data to and read data from storage devices 108 and 110.

In the illustrated embodiment, data storage device 108 includes storage media configured for persistent and/or long-term data storage. Examples of storage media in device 108 include, but are not limited to, a disc stack having one or more data storage discs. However, it is noted that in other embodiments data storage device 108 can include any suitable type of memory components) such as other forms of non-volatile memory as well as volatile memory. Some examples include, but are not limited to, floppy discs, magnetic discs, optical discs, magnetic tapes, and solid-state storage components, to name a few.

Data storage device 110 also includes storage media configured to stored data. In the illustrated embodiment, data storage device 110 comprises a different type of media and/or is separate (e.g., physically spaced) from device 108. Further, device 110 can be configured for intermediate data storage (e.g., a data buffer, a data cache). Alternatively, or in addition, data storage device 110 can be configured for persistent and/ or long-term data storage. For example, data storage device 110 can include non-volatile data memory devices as well as volatile data memory devices.

In the embodiment illustrated in FIG. 1, data storage device 110 comprises a non-volatile solid-state memory, illustratively flash memory. However, while device 110 is described herein with respect to flash memory, it is noted that in other embodiments data storage device 110 can include other forms of memory. Examples include, but are not limited to, hard discs, floppy discs, magnetic discs, optical discs, magnetic tapes, electrically erasable programmable read-only memory (EEPROM), non-volatile random access memory (NVRAM), and other forms of solid-state storage components, to name a few.

In one embodiment, during a data write operation controller 106 receives a portion of data from host 102 and stores the portion of data to one or more of data storage devices 108 and 110. For example, controller 106 stores one or more sectors of data to a track associated with device 108. Further, controller 106 can also be configured to store error correction information (e.g., error detection information, error correction information, and/or redundant data, to name a few) to one or more of data storage devices 108 and 110. For instance, in the above example controller 106 is configured to store error correction code (ECC) for the one or more sectors of data to the second data storage device 110. In another instance, controller 106 is configured to store a redundant copy of the one or more sectors of data to the second data storage device 110.

It is noted that controller 106 can generate the error correction information for received data and/or can obtain the error correction information appended to data received from the host 102. For example, error correction codes for the data can be generated by the host 102 and/or controller 106.

In one embodiment, during a data read operation controller 106 accesses one or more of data storage devices 108 and 110 in response to a command from host 102. For example, controller 106 can utilize translation or mapping information to determine a location of stored information in device(s) 108 and/or 110. Further, controller 106 can obtain error correction information (e.g., error detection information, error correction information, and/or redundant data, to name a few) for the data from one or more of data storage devices 108 and 110. In one embodiment, controller 106 utilizes error correction information stored in device 110 to detect and correct errors occurring in data retrieved from device 108. Corrected data can be returned to the host 102.

Figure 2:
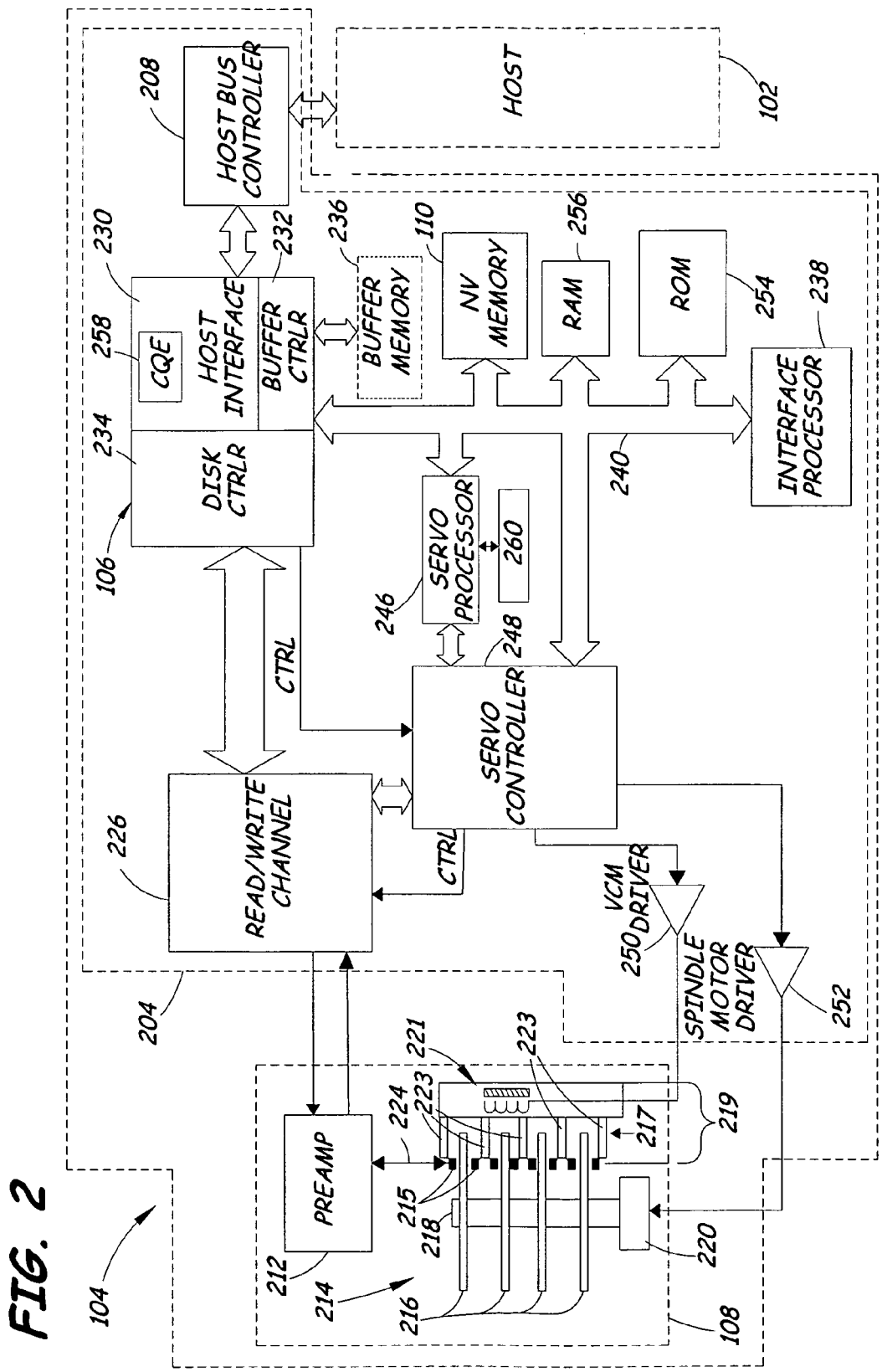
FIG. 2 is a schematic diagram of one embodiment of the data storage system illustrated in FIG. 1.

FIG. 2 is a schematic diagram illustrating one exemplary embodiment of data storage system 104. As shown in FIG. 2, data storage system 104 includes first data storage device 108 (illustratively a disc drive employing a head stack assembly (HSA) 217) and a second data storage device 110 (illustratively a non-volatile (NV) memory such as flash memory). However, it is noted that devices 108 and/or 110 can include other types of data storage media.

Data storage system 104 includes a printed circuit board assembly (PCBA) 204 than includes circuitry and processors, which provide for example a data storage system controller 106 for communicating between host 102 and data storage devices 108 and 110. Host 102 can include a microprocessor-based data processing system such as a personal computer or other system capable of performing a sequence of logical operations. Data is transmitted between host 102 and PCBA 204 via a host bus controller 208.

HSA 217 illustratively includes an actuator assembly 219, a preamplifier 212, and a disc assembly 214. Disc assembly 214 includes a plurality of media discs 216 stacked on a spindle assembly 218. Spindle assembly 218 is mechanically coupled to a spindle motor 220 for rotating the disc at a high rate of speed.

Actuator assembly 219 includes a voice coil motor 221 and multiple actuator arms 223. Located at the end of actuator arms 223 are heads 215, which are associated with a respective disc surface. Heads 215 communicate with PCBA 204 via a cable assembly 224 connected to preamplifier 212 for reading and writing data to the associated disc surface(s). Preamplifier 212 provides an amplified signal to a read/write channel 226 of PCBA 204. Read/write channel 226 performs encoding and decoding of data written to and read from the disc.

A servo processor 246 provides intelligent control of actuator assembly 219 and spindle motor 220 through a servo controller 248. By commands issued to servo controller 248 by servo processor 246, VCM driver 250 is coupled to move actuator assembly 219 and spindle motor driver 252 is coupled to maintain a desired spin rate of spindle motor 220.

In the illustrated embodiment, controller 106 includes a host interface 230, a buffer controller 232, and a disc controller 234. Host interface 230 communicates with host 102 via host bus controller 208 by receiving commands and data from (and transmitting status and data back to) host 102. In one embodiment, a command queuing engine (CQE) 258 is incorporated in host interface 230. Buffer controller 232 controls a buffer memory 236, which can include non-volatile and/or volatile memory. It is noted that buffer memory 236 can be provided with, or can be separate from, NV memory 110.

In one embodiment, disc controller 234 tracks the timing of data sectors passing under a currently selected head and accordingly sends data to and receives data from read/write channel 226. Controller 106 can also provide for error correction and error detection on data transmitted to and read from discs 214.

In one embodiment, an interface processor 238 manages a queue of commands received from host 102 with the assistance of the CQE 258 embedded in host interface 230. Interface processor 238 interfaces with functional elements of PCBA 204 over a bus 240 for transfer of commands, data, and status.

Operational programs can be stored in read-only memory (ROM) 254 and/or any other non-volatile storage, such as NV memory or disc, and can be loaded into random access memory (RAM) or program loading memory 256 for execution by interface processor 238. Suitably, servo processor 246 can have integrated or separate memory 260 for storage of servo programs.

Figure 3:
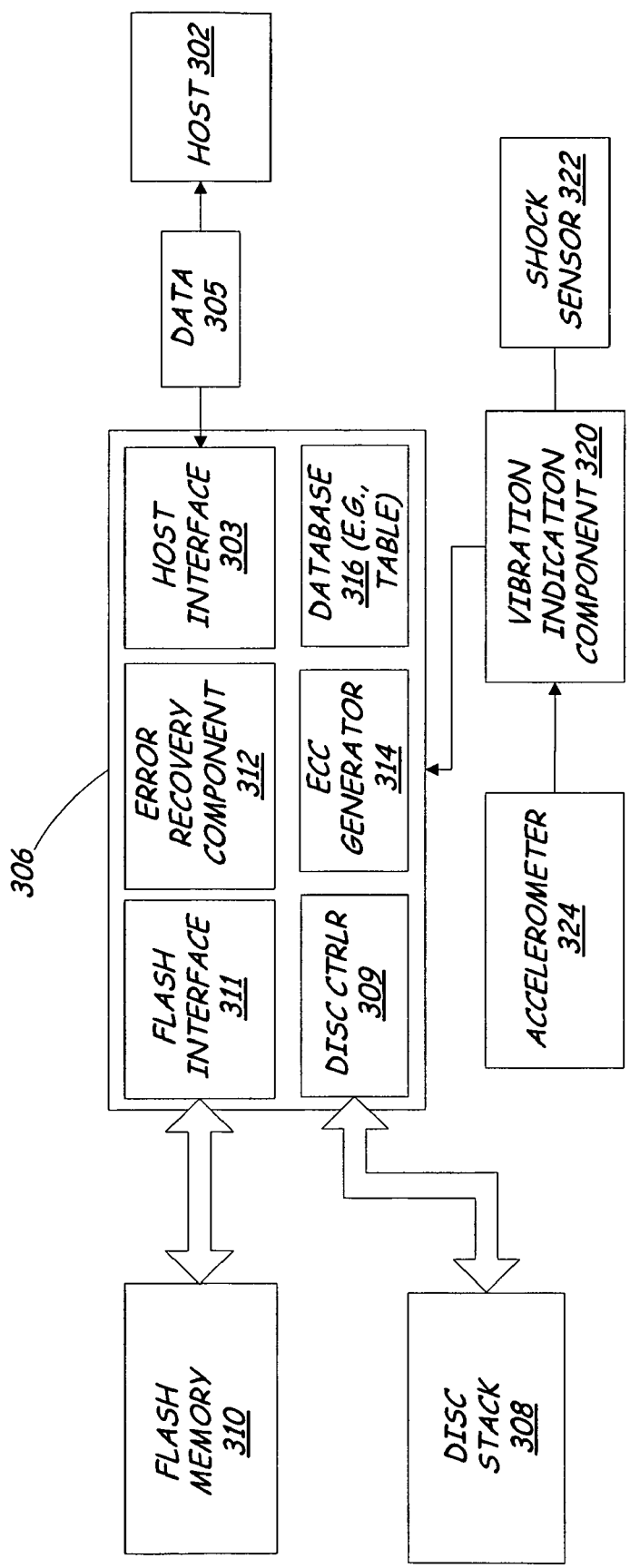
FIG. 3 is a schematic diagram illustrating one embodiment of a data storage system controller.

FIG. 3 illustrates one embodiment of a data storage system controller 306. In one example, controller 306 is substantially similar to controller 106 illustrated in FIG. 1.

Controller 306 communicates data with a host 302 and is configured to store data to one or more data storage devices. In the embodiment of FIG. 3, a first data storage device 308 comprises a hard disc stack and second data storage device 310 comprises flash memory.

Controller 306 includes a host interface 303 that is configured to receive (and transmit) data 305 from host 302. Controller 306 also includes an interface (illustratively a disc controller 309) for communicating with device 308 and a flash interface 311 for communicating with device 310.

Controller 306 also includes an error recovery component 312 that is configured to obtain error correction information, such as error correction code, error detection code, and/or redundant data, for data 305. In one embodiment, component 312 is configured to generate error correction information for data 305. Alternatively, or in addition, the component 312 is configured to obtain error correction information (for example, generated by host 302) from data 305 received from host 302. For example, error correction information can be appended to the transmission of data 305. In another example, information (such as an attribute) is provided with the transmission of data 305 to the controller 306. Controller 306 is configured to utilize the information (e.g., attribute) to generate error correction information for the data.

Herein, error correction information refers to any type of information that can be utilized to detect and/or correct errors occurring on data. For instance, in one example error correction information comprises error correction code that is generated for correcting errors in data 305. In another example, the error correction information can include a redundant copy of the data 305 that can be utilized to recover errors in data 305. It is noted that these are examples of types of information that can be used to recover errors in data and is not intended to limit the scope of the concepts described herein.

In the embodiment illustrated in FIG. 3, error recovery component 312 can include an error correction code (ECC) generator 314 that is configured to generate an error correction code for data 305. Further, error recovery component 312 is configured to utilize error correction code to recover errors associated with data 305.

In accordance with one embodiment, the error recovery component 312 selectively generates error correction information for selected portions of data 305 received from host 302. This can include some or all of the data 305 received from host 302. In one particular example, the error recovery component 312 generates error correction information for a selected portion of data 305, but not all portions of data 305.

Further, the error recovery component 312 can be configured to generate different types of error correction information for portions of data. For example, component 312 can generate a first type of error correction information for a first portion of data and a second type of error correction information for a second portion of data. The first and second types of error correction information can be the same, substantially similar, or different. For example, in one embodiment the component 312 generates error correction code for a first portion of data 305 and a redundant copy for a second portion of data 305. In another embodiment, component 312 is configured to generate different types of error correction code for different portions of data. Examples of types of error detection and correction codes include, but are not limited to, check bits, parity bits, check sums, redundancy checks, turbo codes, hamming codes, and Reed-Solomon codes, to name a few.

Controller 306 is configured to store the data 305 in the first data storage device 308 and the error correction information for the data 305 in the second data storage device 310. Alternatively, or in addition, controller 306 can store the data in data storage device 310 and can store the error correction information in the data storage device 308. Further, controller 306 can include a database 316 (for example, a table) that contains mapping information that associates the location where data is stored in devices 308 and/or 310 with error correction information for the data. In one particular example, database 316 includes an entry that identifies one or more storage locations in device 308 where data 305 is stored and one or more storage locations in device 310 where the error correction information for data 305 is stored.

During a read operation, the controller accesses data from data storage device 308 (and/or data storage device 310). The controller 306 determines if the accessed data contains one or more errors (e.g., a number of errors above a threshold). If the data contains a number of errors, the database 316 can be accessed to retrieve the appropriate error correction information from device 310 (and/or device 308). The error correction information is utilized by controller 306 to correct the errors occurring in the data. Controller 306 can return the corrected data to host 302.

In accordance with one embodiment, controller 306 generates error correction information based on attributes associated with the data. The attributes provide information regarding the data. For example, the attributes associated with the data 305 can include, but are not limited to, an importance factor, a priority level, content, a type, a size, a location, a format, and/or a likelihood of errors associated with the data. Further, in one embodiment the attributes can comprise a portion of data (e.g., a block, sector, etc.) that is transmitted to controller 306 with the data 305. For example, the attributes are provided in a preamble portion of the data. In another example, the attributes are provided with a command associated with the data.

Based on the attributes, the controller 306 determines whether error correction information is generated for one or more portions of the data and/or a type of error correction information to be generated for the one or more portions of data. In one embodiment, the attributes identify some or all of the data as being critical or non-critical data. Critical data includes any data that the host and/or controller specifics as being of particular importance. For example, critical data can include, but is not limited to, operating system files, BIOS files, files related to operation of the data storage system, journaling-type data, and the like. Further, critical data can include any data that requires a high degree of accuracy whereas non-critical data can include any data that may not require a high degree of accuracy. For example, critical data can require a high degree of accuracy based on the type of data and/or a content of the data.

Moreover, the controller 306 can selectively generate error correction information based on an amount of remaining storage space in the devices 308 and/or 310. For instance, in an example where controller 306 stores error correction information to flash memory 310, the controller 306 can be configured to selectively generate and store error correction information to the flash memory 310 such that an amount of available free space in flash memory 310 remains above a threshold amount. In this example, controller 306 is configured to only generate error correction information for certain data (e.g., high priority data, critical data, etc.) such that a threshold or maximum capacity of the data storage devices is not reached. For instance, controller 306 can be configured to adjust criteria for selective generation and storage of error correction information based on the available free space in flash memory 310. Further, the error correction information stored in the devices (e.g., flash memory 310) can be flushed to another data storage device (e.g., disc stack 308) after a predetermined amount of time and/or a particular capacity is reached.

Further, the controller 306 can selectively generate error correction information based on an amount of power remaining in a power source. For example, in one embodiment a data storage system can include an exhaustible power source, such as a battery. The controller 306 can be configured to adjust criteria for selective generation and storage of error correction information based on a level of remaining power in the source. For example, the controller 306 can be configured to generate error correction information for most or all data if a remaining power level drops below a threshold.

In accordance with one embodiment, the attributes associated with the data for selectively generating the error correction information can comprise an indication from a vibration indication component 320. Component 320 provides an indication to controller 306 that a vibration and/or shock event, for example, is about to occur. This can include receiving indications related to operational modes of host 302. Examples include, but are not limited to, indications that a vibrator, ringer, speaker, or other device associated with host 302 is about to activate. In one embodiment, vibration indication component 320 can include a shock sensor 322 and/or accelerometer 324 associated with the data storage system.

In accordance with another embodiment, the attributes associated with the data for selectively generating the error correction information can comprise information regarding a designated media storage location. For example, in one embodiment data 305 includes associated address information designating a number of storage locations (i.e., sectors) in disc stack 308. Based on the address information, controller 306 can obtain information about the designated storage location(s). For example, in one embodiment controller 306 determines a likelihood that the storage locations contain media defect(s). For instance, controller 306 can obtain information from a database (i.e., a database associated with controller 306, a table stored in media 308 and/or 310, etc.) that indicates whether prior operations (e.g., write operations, read operations, access operations) to the designated media storage locations contained or resulted in data errors.

Figure 4A:
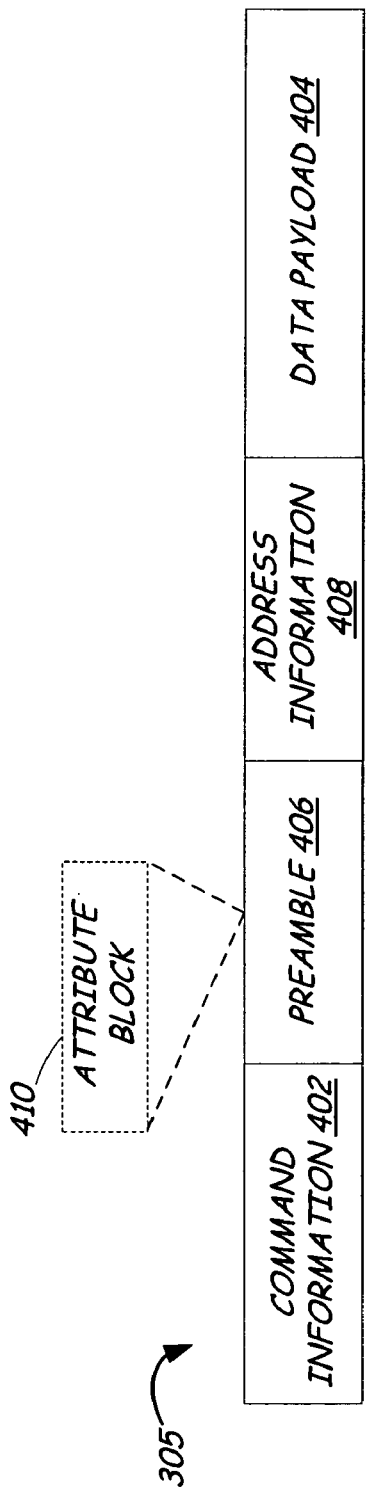
FIGS. 4A and 4B illustrate one embodiment of a portion of data including at least one attribute for selectively generating error correction information.

FIG. 4A illustrates one embodiment of data 305 for which controller 306 can selectively generate error correction information. In the embodiment of FIG. 4A, data 305 is associated with a write operation and illustratively includes command information 402 and a data payload 404. Data 305 also includes a preamble portion 406 and address information 408 for performing a write operation for payload data 404. For example, the data in payload 404 can comprise user data sent from host 302 that is to be stored in data storage device 308, illustrated in FIG. 3. Portions 402, 404, 406, and 408 can be received with a single command (i.e., a single write command) (or over multiple commands) from the host and can comprise contiguous portions of data 305.

Figure 4B:
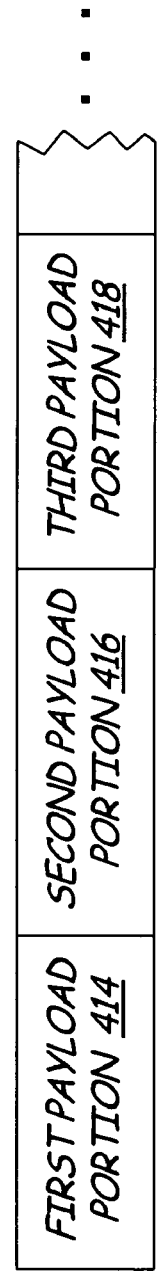

FIG. 4B illustrates one embodiment of data payload 404. Data payload 404 illustratively includes at least a first payload portion 414, a second payload portion 416, and a third payload portion 418. Error correction information is selectively generated for one or more of the portions 414, 416, and 418 based on attributes associated with the data 305.

In accordance with one embodiment, the attributes associated with data 305 are provided in an attribute block 410 and are utilized by controller 306 to generate error correction information for one or more portions of data 305. In the embodiment illustrated in FIG. 4A, the attribute block 410 is provided in the preamble portion 406 of the data. In other embodiments, attribute(s) can be provided in the command portion 402, address portion 408, and/or data payload portion 404. The attribute block 410 provides information that is utilized by the controller 306 to determine portions of the data for which to generate error correction information and/or determine one or more types of error correction information to generate for selected portions of the data 305. As discussed below, the attribute block 410 can include one or more bits of information representing, for example, masks, flags, binary values, and/or decimal values, to name a few.

Figure 5:
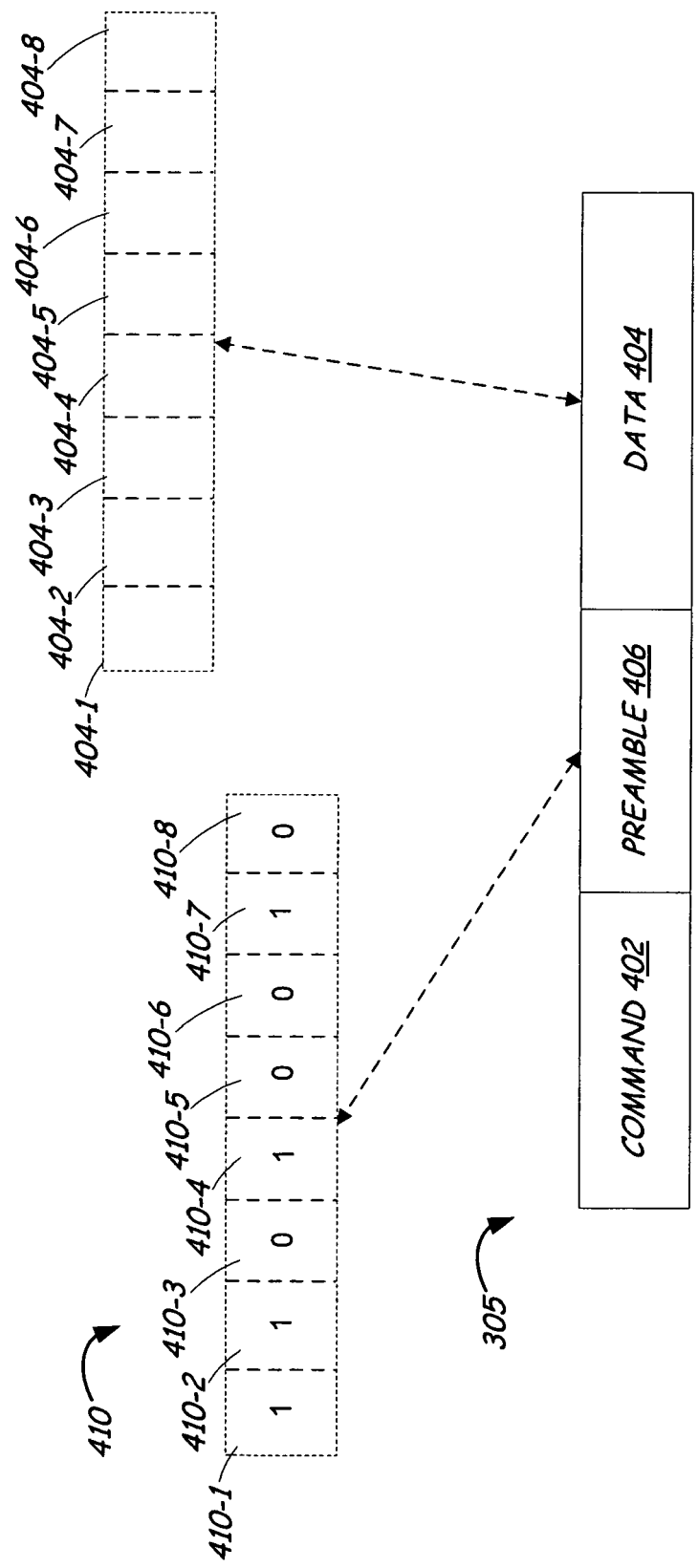
FIG. 5 illustrates one embodiment of a portion of data including at least one attribute for selectively generating error correction information.

FIG. 5 illustrates one embodiment of attribute block 410 associated with data 305. As illustrated in FIG. 5, attribute block 410 comprises a plurality of bits (represented by reference numerals 410-1-410-8). However, it is noted that block 410 can include any number of bits. For example, each portion 410-1-410-8 of attribute block 410 can include one or more bits.

In one embodiment, a numeric value represented by attribute block 410, or portions thereof, is utilized by controller 306 to generate error correction information for data 404. For instance, controller 306 can select particular portions of data 404 and/or particular types of error correction information to generate for data 404 based on a value represented by bits 410-1-410-8.

In accordance with the embodiment illustrated in FIG. 5, data 404 comprises a plurality of portions (e.g., sectors) of data. In the example of FIG. 5, data 404 comprises a plurality of sectors 404-1-404-8. Based on attribute block 410, controller 306 identifies selected sectors from the plurality of sectors 404-1-404-8 of data 404 for which to generate error correction information. Further, based on the attribute block 410, controller 306 identifies one or more types of error correction information to generate for the selected sectors. To illustrate, in one embodiment bit 410-1 corresponds to sector 404-1, bit 410-2 corresponds to sector 404-2, and so on. Based on each of the attributes 410-1-410-8, controller 306 determines whether to generate error correction information for the corresponding sector(s) 404-1-404-8 and identifies a type of error correction information to generate for each corresponding sector(s). For example, a value of the bit(s) of attribute 410-1 can indicate that a first type of error correction code (e.g., a Reed-Solomon code) is generated for data sector 404-1, a value of the bit(s) of attribute 410-2 can indicate that a second type of error correction code (e.g., a Hamming code) is generated for data sector 404-2, and a value of the bit(s) of attribute 410-3 can indicate that redundant data is to be generated for sector 404-3. It is noted that these are examples of attributes and types of error correction information that can be generated, it is not intended to limit the scope of the concepts described herein. For instance, while each attribute portion 410-1-410-8 is illustrated as comprising a single bit, each of portion can comprise multiple bits of data. In this manner, the attribute block 410 can identify different "levels" of error correction information to generate for a number of sectors of data.

Figure 6:
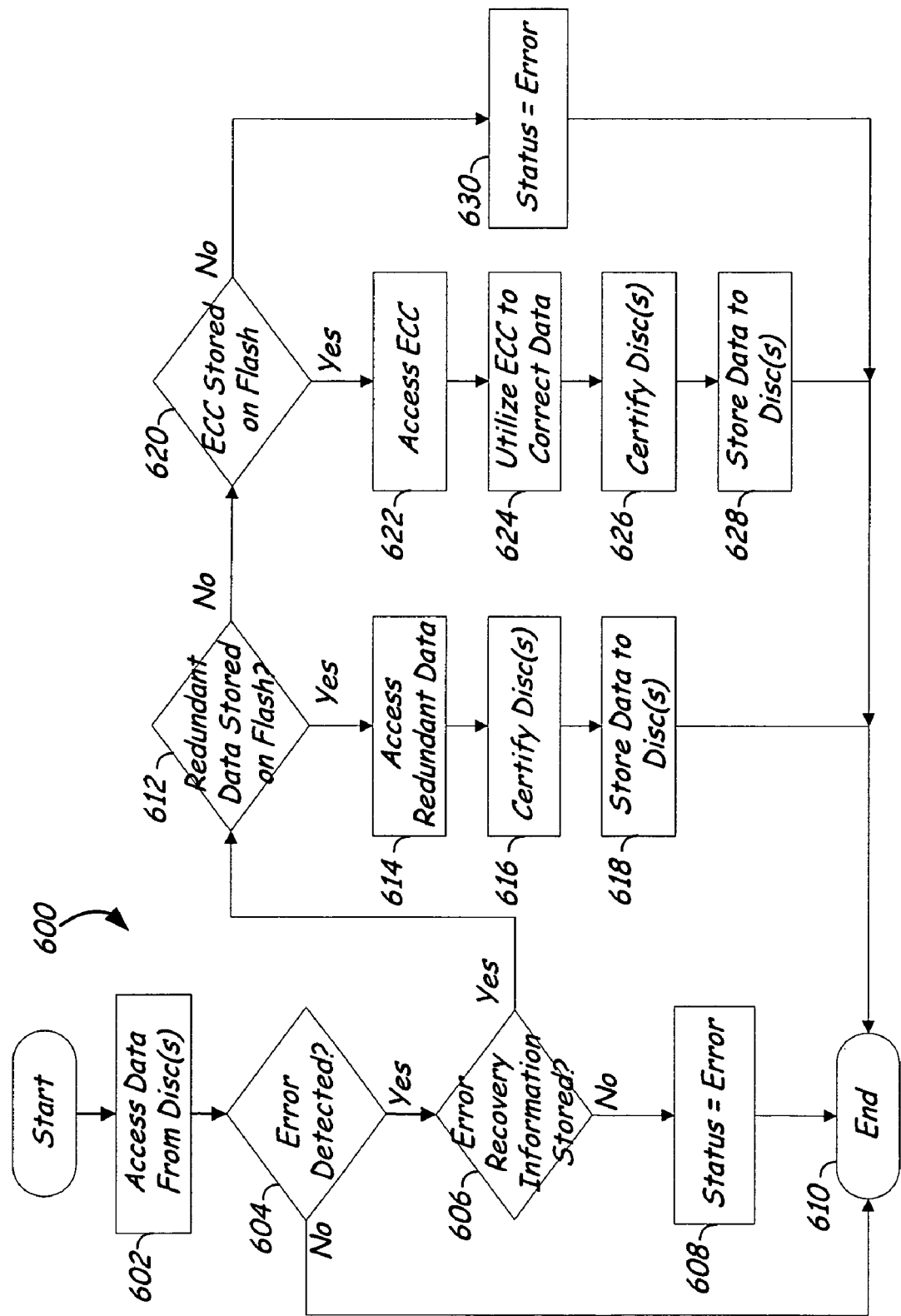
FIG. 6 is a flow diagram of a method of recovering errors in data stored in a data storage device, under one embodiment.
Figure 7:
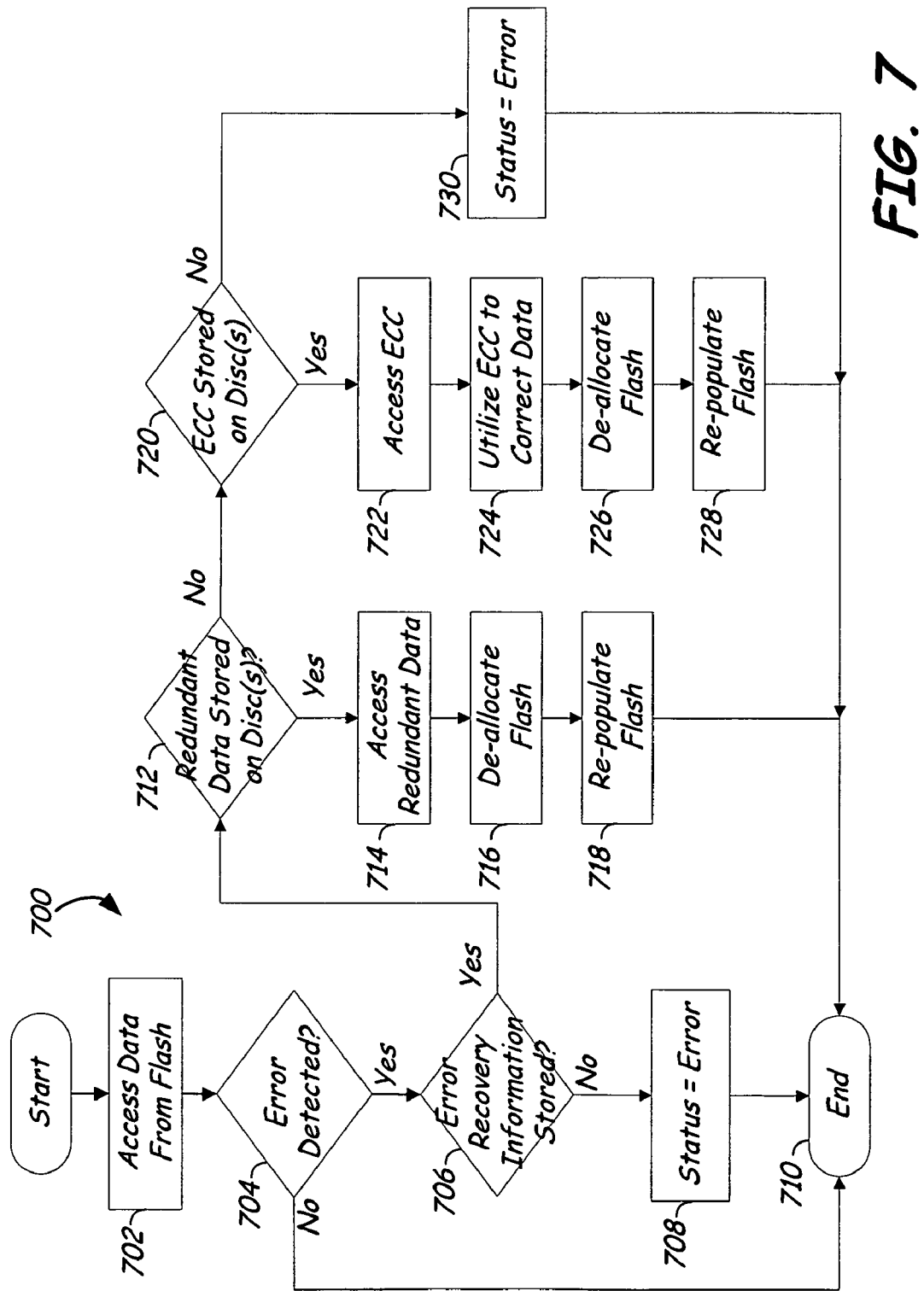
FIG. 7 is a flow diagram of a method of recovering errors in data stored in a data storage device, under one embodiment.

FIGS. 6 and 7 illustrate methods for performing error recovery on stored data. Methods 600 and 700 will be described in the context of FIG. 3 for illustration purposes, which is not intended to limit the scope of the concepts described herein.

Referring to method 600, at step 602 the controller 306 accesses data from one or more storage locations in disc stack 308, for example in response to a read request from host 302. At step 604, the controller determines whether the accessed data contains one or more errors (e.g., a number of errors above a threshold). If no errors are detected, the method ends at block 610. If the controller detects errors, the controller determines whether error correction information is stored at step 606. For example, information from database 316 can be utilized to obtain the error correction information from flash memory 310. If the method determines that no error correction information is stored, the method sets an error status at step 608 and the method ends at step 610. If the method determines that error correction information is stored for the accessed data, the method proceeds to block 612 and determines whether the error correction information comprises redundant data stored in flash memory 310. If redundant data is not stored, the method proceeds to step 620. If redundant data is stored on the flash, the method proceeds to step 614 where the redundant data is accessed. The method 600 can perform a certification operation for the areas of the disc(s) where the data accessed at 602 was stored. For example, step 616 can determine whether the disc(s) contain media defects. In another example, step 616 comprises performing a re-certification of the media by checking the media associated with the storage locations, determining a type of the error, and performing a media correction operation to fix the media. Further, step 616 can include updating a defect table associated with the media.

At step 618, the redundant data accessed at step 614 is used to recover the correct data which is stored to the disc stack 308. For example, the redundant copy of the data can be stored to the one or more storage locations from which the data was accessed at step 602. For instance, corrected data is used to replace the data that contained the errors and/or can be stored to a spare region of the disc stack.

At step 620, the method determines whether error correction code for the data is stored in flash memory 310. If the method determines that error correction code is not stored, the method proceeds to block 610. An error status can be set at block 630. Alternatively, or in addition, the method 600 can implement other types of error correction algorithms, if desired.

At step 622, the method accesses the error correction code which is utilized at step 624 to correct the data. At step 626, the disc(s) can be certified and the corrected data can be stored to the disc(s) at step 628. In one embodiment, steps 626 and 628 are substantially similar to steps 616 and 618, respectively.

Referring to method 700, at step 702 data is accessed from flash memory 310, for example in response to a read request issued from a host. If no errors are detected (e.g., errors below a threshold) at step 704, the method proceeds to block 710.

At step 706, the method determines whether error recover information is stored. In one example, the controller 306 accesses database 316 to determine if error correction information is stored in disc stack 308. If no error correction information is stored, the method proceeds to step 708 in which an error status is set and the method ends at block 710.

At step 712, the method determines if redundant data is stored on the disc(s). The method accesses the redundant data at step 714. At step 716, the method de-allocates the area of the flash that contained the errors and can re-populate the flash with the redundant data at step 718.

At step 720, the method determines if error correction code is stored on the disc(s). If error correction code is not stored on the disc(s), an error status can be set at step 730 and the method proceeds to block 710. Alternatively, or in addition, the method can perform other types of error correction or recovery operations, if desired.

At step 722, the method accesses the error correction code which is utilized at step 724 to correct the data. The flash can be de-allocated at step 726 and the flash can be re-populated at step 728. In one embodiment, steps 726 and 728 are substantially similar to steps 716 and 718, respectively.

Figure 8:
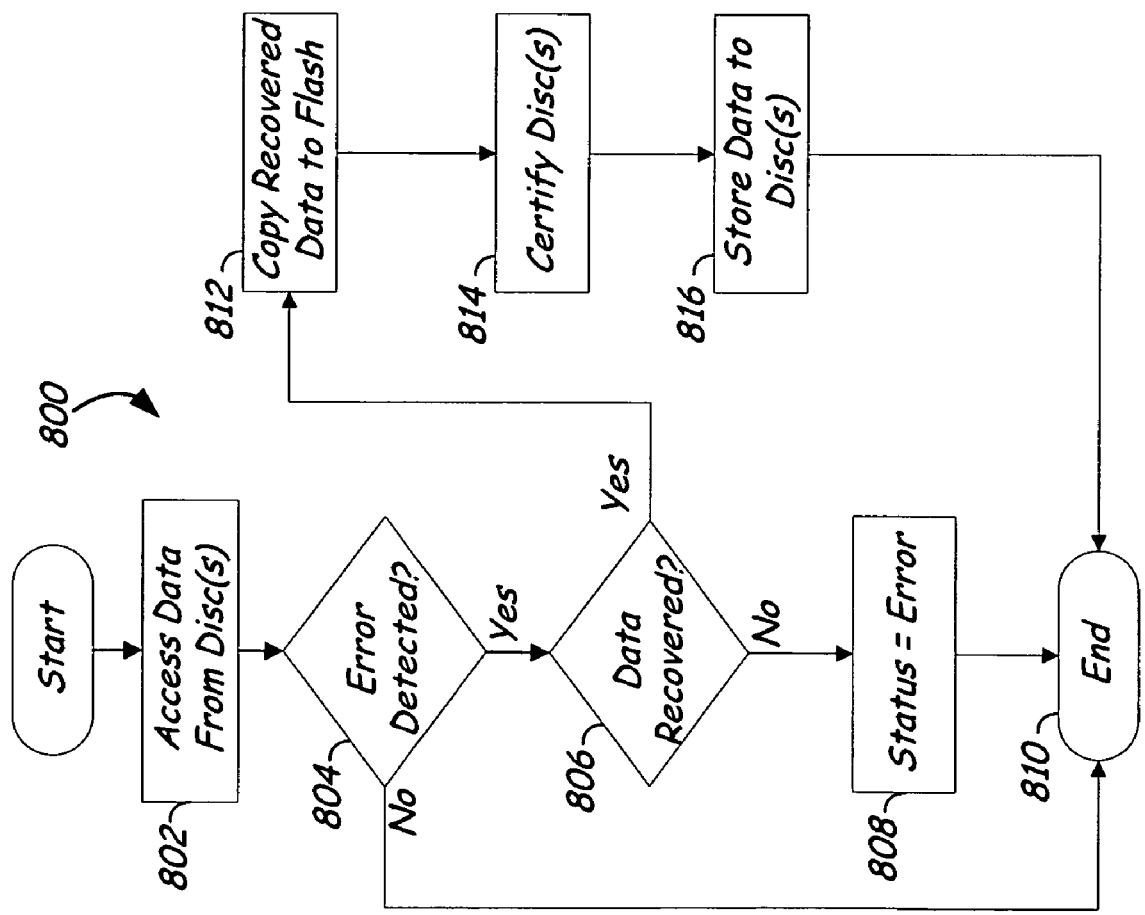
FIG. 8 is a flow diagram of a method of recovering errors in data stored in a data storage device, under one embodiment.

FIG. 8 illustrates a method 800 for recovering data stored in a data storage system. Method 800 will be described in the context of FIG. 3 for illustration purposes, which is not intended to limit the scope of the concepts described herein. At step 802, the method accesses data from disc stack 308. If an error in the accessed data is not detected at step 804, the method proceeds to block 810. If errors are detected, the method proceeds to step 806 in which the method attempts to recover the data. For example, the method can utilize redundant data and/or error correction code. If the data cannot be recovered, an error status is set at step 808 and the method ends at block 810.

If the data can be recovered, the method proceeds to block 812 in which a copy of the recovered data is stored to the flash memory 310. While the recovered data is stored in the flash, the areas of the disc stack 308 (that contained the data accessed at step 802) are re-certified. In one embodiment, step 814 is similar to step 626 described in FIG. 6. At step 816, the recovered data is stored to the disc(s). The data can be stored to a spare area of the disc(s) and/or can be stored to the original storage locations that contained the data accessed at step 802.

During the re-certification process at step 814, the data stored in the flash (step 812) can be used by the controller to service any subsequent data requests. For example, a read request from the host can be performed by accessing the data stored in the flash. In one embodiment, the method performs the re-certification process in the background such that the subsequent requests are not substantially interfered. For example, the re-certification process at step 814 can be performed when the data storage system is idle.

It is to be understood that even though numerous characteristics and advantages of various embodiments of the invention have been set forth in the foregoing description, together with details of the structure and function of various embodiments of the disclosure, this disclosure is illustrative only, and changes may be made in detail, especially in matters of structure and arrangement of parts within the principles of the present disclosure to the full extent indicated by the broad general meaning of the terms in which the appended claims are expressed. For example, the particular elements may vary depending on the particular application for the system or method while maintaining substantially the same functionality without departing from the scope and spirit of the present disclosure and/or the appended claims.

What is claimed is:

1. A data storage system comprising:
a first data storage device comprising a first non-volatile data storage medium;
a second data storage device comprising a second non-volatile data storage medium; and
a controller configured to store data to the first data storage device, wherein the controller is configured to selectively generate error correction information for selected portions of the data based on at least one attribute associated with the data and store the error correction information in the second data storage device.

2. The data storage system of claim 1, wherein the first data storage medium comprises a magnetic disc and the second data storage medium comprises a non-volatile solid-state memory.

3. The data storage system of claim 1, comprising:
an interface that is coupleable to a host to receive transmitted data, wherein the first and second data storage devices are coupled to the interface to communicate with the host.

4. The data storage system of claim 1, wherein the at least one attribute is utilized by the controller to identify the selected portions of the data and generate a selected type of error correction information for the selected portions.

5. The data storage system of claim 4, wherein the at least one attribute comprises a value that is utilized by the controller to identify a type of error correction information selected from a plurality of types of error correction information.

6. The data storage system of claim 4, wherein the one or more types of error correction information comprises at least one of an error correction code and a redundant copy of the selected portion of data.

7. The data storage system of claim 6, wherein the one or more types of error correction information comprise a plurality of different types of error correction codes generated for portions of the data.

8. The data storage system of claim 7, wherein the data comprises at least a first portion and a second portion, and wherein the controller selectively generates error correction information for the second portion, but not the first portion, based on a first attribute associated with the first portion of data and a second attribute associated with the second portion of data.

9. The data storage system of claim 7, wherein the data comprises at least a first portion and a second portion, and wherein the controller selectively generates a first type of error correction code for the first portion and a second type of error correction code for the second portion based on the at least one attribute associated with the data, the first and second types of error correction code being different.

10. The data storage system of claim 4, wherein the at least one attribute is received from a host device with at least one of a command and a preamble of the data.

11. The data storage system of claim 1, wherein the at least one attribute comprise an indication from a sensor regarding at least one of a vibration and shock event associated with the data storage device.

12. The data storage system of claim 1, wherein the at least one attribute comprises at least one of a type, a content, an importance factor and a priority level associated with the data.

13. A controller for a data storage device, the controller comprising:
  an input for receiving data to be stored in the data storage device;
  a processing component configured to identify information associated with an attribute related to the data and selectively generate error correction information for selected portions of the data based on the attribute, wherein the data is stored to a first data storage medium in the data storage device; and
  an output for storing the error correction information to a second data storage medium in the data storage device that is different than the first data storage medium.

14. The controller of claim 13, wherein the data comprises at least a first portion and a second portion of data received with a single write command, and wherein the processing component is enabled to selectively generate error correction information for the second portion of data, but not the first portion, based on the attribute.

15. The controller of claim 13, wherein the information associated with an attribute related to the data comprises an indication of a type of the data.

16. The controller of claim 15, wherein the information associated with an attribute related to the data comprises an indication that the data comprises critical data.

17. The controller of claim 16, wherein the attribute comprises a block of the data having a value that is utilized by the processing component to selectively implement a particular algorithm for selectively generating the error correction information.

18. The controller of claim 17, wherein the processing component uses the value to select one algorithm for generating the error correction information from a plurality of available algorithms.

19. A device comprising:
  a first data storage medium;
  a second data storage medium;
  a controller configured to access a portion of data stored in one or more storage locations in the first data storage medium, the portion of data containing at least one error, wherein the controller is configured to correct the at least one error and store the corrected portion of data in the second data medium, and wherein the controller is configured to perform a re-certification operation for the one or more storage locations while the corrected portion of data is stored in the second data storage medium.

20. The device of claim 19, wherein the controller is configured to correct the portion of data utilizing at least one of an error correction code associated with the portion of data and a redundant copy of the portion of data stored in the second data storage medium.

21. The device of claim 20, wherein the controller is configured to perform the re-certification by checking the media associated with the one or more storage locations, determine a type of error associated with the at least one error, perform a media correction operation to fix the media associated with the one or more storage locations, and update a defect table associated with the first data storage medium.

* * * * *